United States Patent
Cheon et al.

(10) Patent No.: US 9,129,282 B2
(45) Date of Patent: Sep. 8, 2015

(54) NEAR FIELD COMMUNICATION APPARATUS AND METHOD FOR SUPPORTING SECURITY MODULES

(75) Inventors: Sung-Rock Cheon, Seoul (KR); Jae-Sic Jeon, Seoul (KR); O-Hyon Kwon, Seoul (KR); Joo-Sik Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 110 days.

(21) Appl. No.: 13/468,806

(22) Filed: May 10, 2012

(65) Prior Publication Data

US 2012/0220229 A1 Aug. 30, 2012

Related U.S. Application Data

(63) Continuation of application No. 11/514,347, filed on Sep. 1, 2006, now Pat. No. 8,209,754.

(30) Foreign Application Priority Data

Sep. 8, 2005 (KR) ........................ 10-2005-0083564

(51) Int. Cl.
*G06F 21/00* (2013.01)
*G06Q 20/36* (2012.01)
(Continued)

(52) U.S. Cl.
CPC .......... *G06Q 20/367* (2013.01); *G06Q 20/3678* (2013.01); *H04L 63/0853* (2013.01); *H04L 69/03* (2013.01); *H04L 69/08* (2013.01); *H04W 12/06* (2013.01); *H04W 80/00* (2013.01)

(58) Field of Classification Search
CPC ...... H04B 5/0031; H04B 5/00; H04B 1/3816; G06Q 20/367; G06Q 20/3678; H04L 69/08; H04L 69/03; H04L 63/0853; H04W 12/00; H04W 12/06; H04W 80/00; G06F 2213/3804
USPC .............. 713/172, 185, 159; 726/9, 5, 16, 17; 380/270, 247, 249, 250, 287, 52; 340/10.1, 10.3, 10.4, 10.42, 10.5, 340/10.51; 307/151; 379/433.09; 370/465–467; 710/300–304, 105–106
See application file for complete search history.

(56) References Cited

U.S. PATENT DOCUMENTS

| 6,776,339 B2 * | 8/2004 | Piikivi .......................... 235/451 |
| 2003/0112613 A1 * | 6/2003 | Nishizawa et al. ........... 361/764 |

(Continued)

FOREIGN PATENT DOCUMENTS

| EP | 1168770 | 1/2002 | |
| WO | 2004105359 | 12/2004 | |
| WO | WO 2006111781 A1 * | 10/2006 | ............. G06K 19/07 |

OTHER PUBLICATIONS

Phillips; "S2c Interface for NFC"; Adding a general purpose interface between NFC and Secure IC to Secure NFC; Jan. 21, 2005; Survey V1.0; 12 pages.

(Continued)

*Primary Examiner* — Eleni Shiferaw
*Assistant Examiner* — Hilary Branske
(74) *Attorney, Agent, or Firm* — Lowe Hauptman & Ham, LLP

(57) ABSTRACT

The present disclosure provides a terminal comprising: a socket configured to receive a security module; an NFC (Near Field Communication) unit configured to communicate with an external reader or another terminal; and a protocol identifying unit configured to supply a voltage to the security module and to identify whether the security module supports a first protocol by transmitting a signal for using the first protocol through a first contact of the security module and receiving from the security module a first information associated with a protocol supported by the security module, wherein the terminal additionally receives a second information associated with the protocol supported by the security module through a second contact of the security module, and wherein the NFC unit receives a information from the security module through the first contact based on the first protocol identified by the protocol identifying unit, and transmits the received information to the external reader or another terminal.

12 Claims, 10 Drawing Sheets

(51) Int. Cl.
*H04L 29/06* (2006.01)
*H04W 12/06* (2009.01)
*H04W 80/00* (2009.01)

(56) References Cited

U.S. PATENT DOCUMENTS

| | | |
|---|---|---|
| 2004/0235450 A1 | 11/2004 | Rosenberg |
| 2005/0045720 A1 | 3/2005 | Fruhauf |
| 2005/0056704 A1* | 3/2005 | Kim .............................. 235/492 |
| 2005/0094463 A1* | 5/2005 | Nishizawa et al. ............ 365/222 |
| 2006/0014566 A1* | 1/2006 | Ishibashi ........................ 455/557 |
| 2006/0043202 A1* | 3/2006 | Kim et al. ...................... 235/492 |

OTHER PUBLICATIONS

ECMA; Standard ECMA-352; "Near Field Communication Interface and Protocol-2(NFCIP-2)"; Dec. 2003; 1st Edition; 8 pages.
European Search Report for EP06254607, citing the above reference(s).

* cited by examiner

NEAR FIELD COMMUNICATION APPARATUS AND METHOD FOR SUPPORTING SECURITY MODULES

CROSS-REFERENCE TO RELATED APPLICATIONS

This application is a continuation of U.S. patent application Ser. No. 11/514,347 filed on Sep. 1, 2006, which claims priority to Korean Patent Application No. 2005-0083564 filed on Sep. 8, 2005, both of which are hereby incorporated by reference in their entirety.

TECHNICAL FIELD

The present disclosure relates to a Near Field Communication (NFC) apparatus and method that are capable of supporting security modules. More particularly, the present disclosure relates to a terminal for communications by NFC, a communication method for use with a terminal including an NFC unit, and a method for a USIM to perform communications.

BACKGROUND

The statements in this section merely provide background information related to the present disclosure and may not constitute prior art.

FIG. 1 is a block diagram showing the construction of a conventional secure NFC apparatus 100. Referring to FIG. 1, the secure NFC apparatus 100 includes an NFC unit 110 and the security module 120.

The NFC unit 110 may be controlled by the host processor of a mobile communication terminal or the like, and it communicates with the security module 120 via signals SigIn and SigOut based on the S2C interface. The security module 120 is a kind of Subscriber Identity Module (SIM), and may store authentication information for user identification. The S2C interface was developed by Philips Electronics for the purpose of communication between the NFC unit 110 and the security module 120.

The secure NFC apparatus 100 may be mounted in a portable terminal such as a mobile communication terminal. The secure NFC apparatus 100 may perform the function of a traffic card or a smart card.

For example, a user who attempts to pass through a security gate brings a portable terminal equipped with the secure NFC apparatus 100 close to a main body that is installed at the security gate for entry authentication, and authentication information is transmitted to the main body through the antenna 111 of the secure NFC apparatus 100 to be used for entry authentication. If the authentication is successful, the user can pass through the security gate.

Furthermore, a user brings the portable terminal equipped with the secure NFC apparatus 100 close to a reader for authenticating the amount of charged money, and the user can be allowed to use transportation and pay for shopping depending on whether the authentication by the reader is successful.

DISCLOSURE

Technical Problem

However, the prior art secure NFC apparatus 100 supports only the security module 120 that communicates with the NFC unit 110 based on the S2C interface. Therefore, in the case where other security authentication modules, such as a contact smart card core chip based on the International Standards Organization (ISO) 7816 protocol or a non-contact smart card core chip based on the ISO 14443 protocol, are used as the security module 120, the interface specifications of the security authentication modules are not compatible with those of the NFC unit 110. Accordingly, data associated with the modules used (for example, authentication information) is not compatible, so there is a problem in that the management of data is inconvenient.

Furthermore, there has been an attempt to make the NFC unit 110 receive data, such as authentication information, from the outside and the security module 120 manage the data. However, the scheme related to this attempt was not satisfactory. Furthermore, the scheme encountered difficulty in that it is difficult to manage personal information, such as electronic name cards, managed in a mobile communication terminal because the scheme does not support peer-to-peer data transmission and reception between mobile communication terminals.

SUMMARY

Accordingly, the present disclosure has been made keeping in mind the above problems occurring in the prior art, and an object of the present disclosure is to provide A terminal comprising: a socket configured to receive a security module; an NFC (Near Field Communication) unit configured to communicate with a external reader or another terminal; and a protocol identifying unit configured to supply a voltage to the security module and to identify whether the security module supports a first protocol by transmitting a signal for using the first protocol through a first contact of the security module and receiving from the security module a first information associated with a protocol supported by the security module, wherein the terminal additionally receives a second information associated with the protocol supported by the security module through a second contact of the security module, and wherein the NFC unit receives a information from the security module through the first contact based on the first protocol identified by the protocol identifying unit, and transmits the received information to the external reader or another terminal.

Another embodiment of the present disclosure provides A communication method comprising: supplying a prescribed voltage to a security module; checking whether the security module supports a first protocol by transmitting a signal for using the first protocol through a first contact of the security module and receiving from the security module a first information associated with a protocol supported by the security module; receiving a second information associated with the protocol supported by the security module through a second contact of the security module; receiving a information from the security module through the first contact based on the first protocol if it is confirmed that the security module supports the first protocol; and transmitting the received information through a NFC unit to an external reader or another terminal.

Yet another embodiment of the present disclosure provides A communication method comprising: receiving a signal for use of a first protocol through a first contact at a USIM; transmitting a first information associated with a protocol supported by the USIM through the first contact within a time period from receiving the signal for using the first protocol; providing a second information associated with the protocol supported by the USIM through a second contact which is different from the first contact; and communicating through the first contact based on the first protocol.

DESCRIPTION OF DRAWINGS

The above and other objects, features and advantages of the present disclosure will be more clearly understood from the following detailed description taken in conjunction with the accompanying drawings, in which.

DETAILED DESCRIPTION

Figure 1:
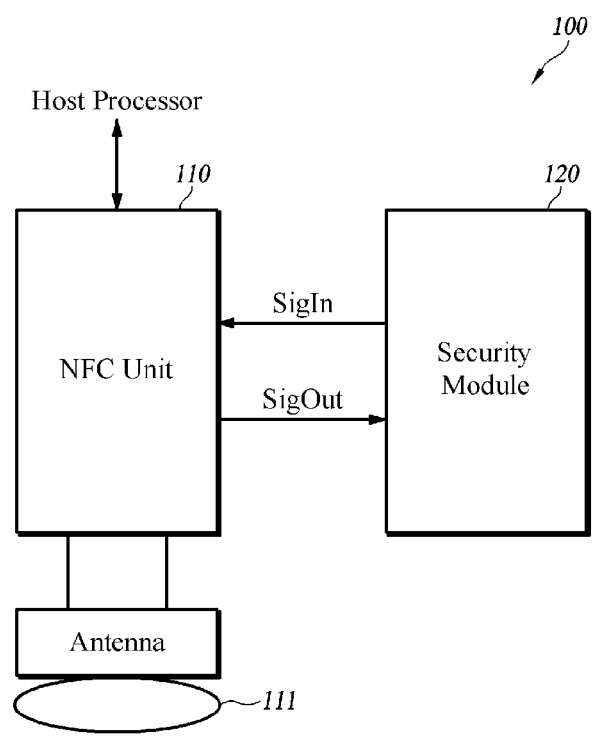
FIG. 1 is a block diagram showing the construction of a conventional secure NFC apparatus.

Reference should now be made to the drawings, in which the same reference numerals are used throughout the different drawings to designate the same or similar components.

Figure 2:
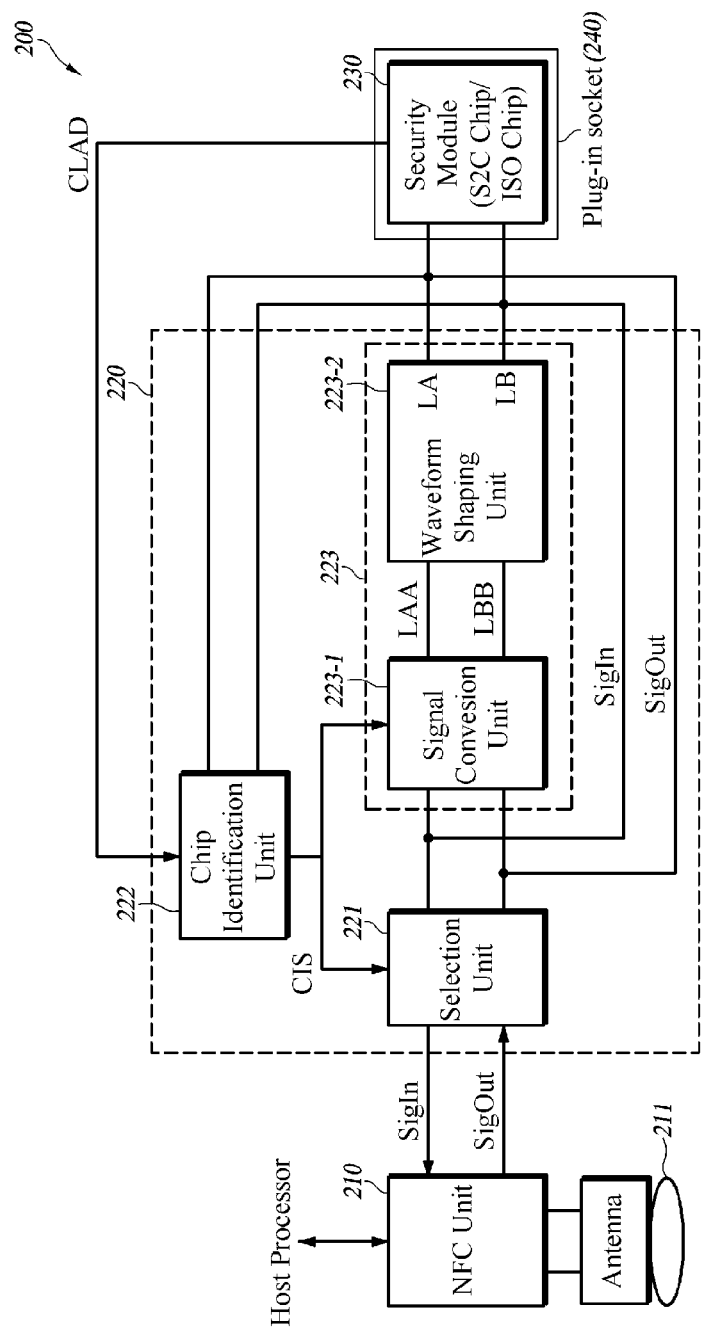
FIG. 2 is a block diagram showing the construction of a secure NFC apparatus according to an embodiment of the present disclosure.

FIG. 2 is a block diagram showing the construction of a secure NFC apparatus 200 according to an embodiment of the present disclosure. Referring to FIG. 2, the NFC apparatus 200 includes an NFC unit 210, a protocol matching unit 220, a security module 230, and a plug-in socket 240 into which the security module 230 is inserted.

Figure 9:
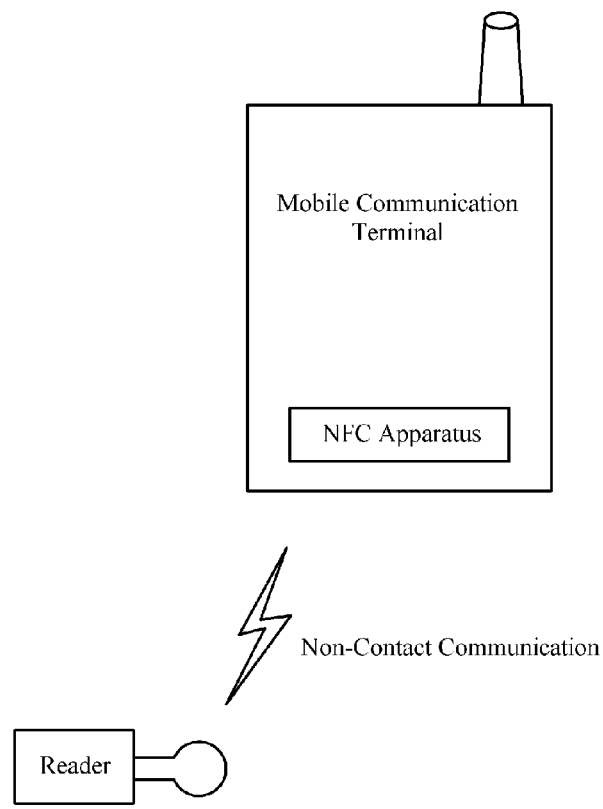
FIG. 9 is a diagram showing the relationship of a communication application between a mobile communication terminal equipped with the secure NFC apparatus and a reader, according to an embodiment of a present disclosure.
Figure 10:
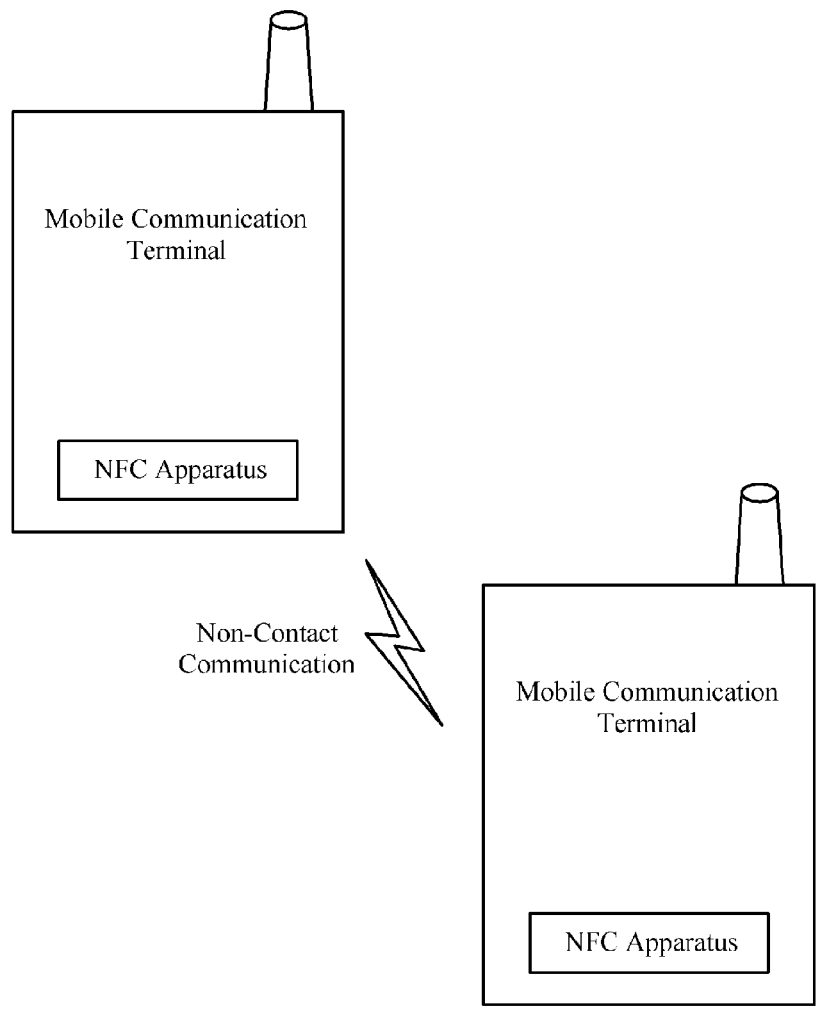
FIG. 10 is a diagram showing the relationship of a communication application between mobile communication terminals each equipped with the secure NFC apparatus, according to an embodiment of a present disclosure.

The secure NFC apparatus 200 may be mounted in a portable terminal, such as a mobile communication terminal. The secure NFC apparatus 200, as shown in FIG. 9, may perform the function of a traffic card or a smart card via communication with a reader. Furthermore, the present disclosure is proposed such that peers, that is, mobile communication terminals, equipped with secure NFC apparatuses 200 can exchange personal information with each other, as shown in FIG. 10.

In particular, unlike the fact that a conventional secure NFC processor supports only communication with a specific security authentication module communicating based on the S2C interface, in the present disclosure, the protocol matching unit 220 performs protocol conversion on security authentication modules that do not follow the S2C protocol when security modules 230, such as modules that have security authentication chips and follow not only the S2C protocol of NFC but also the ISO protocols of contact smart cards based on the general ISO 7816 protocol or a non-contact smart cards based on the ISO 14443 protocol, are inserted into the socket 240 in a plug-in fashion and are compatible in NFC.

The NFC unit 210 is an NFC processor that performs non-contact NFC interfacing with an external reader or the NFC apparatus of a peer terminal using first and second base-band signals SigIn and SigOut based on the S2C protocol. The NFC unit 210 can operate under the control of the host processor of a mobile communication terminal equipped with the secure NFC apparatus 200.

The NFC unit 210 receives the first base-band signal SigIn based on the S2C protocol from the protocol matching unit 220, and processes the first base-band signal SigIn into information in Radio Frequency (RF) form, which corresponds to the first signal SigIn. The NFC unit 210 transmits the generated information to a reader or a peer terminal via non-contact NFC through an antenna 211.

The NFC unit 210 may receive RF information from the reader or the peer terminal via NFC through the antenna 211. The NFC unit 210 may process the received RF information, generate the second base-band signal SigOut based on the S2C protocol, and transmit the generated second signal SigOut to the protocol matching unit 220.

The protocol matching unit 220 matches the protocols of the signals, which are input and output between the NFC unit 210 and the security module 230, with each other according to a chip identification signal CIS indicating the chip type of the security module 230. For example, in the case where the chip of the security module 230 is identified as a chip using the S2C protocol based on the chip identification signal CIS, the protocol matching unit 220 connects the two Input/Output (I/O) terminals of the NFC unit 210 with the two I/O terminals of the security module 230, thereby bypassing the signals SigIn and SigOut based on the S2C protocol, which are respectively input to and output from the NFC unit 210 to the security module 230, and bypassing the signals which are respectively input to and output from the security module 230 to the NFC unit 210. Furthermore, in the case where the chip of the security module 230 is identified as the security authentication chip of a non-contact smart card based on the ISO 14443 protocol according to the chip identification signal CIS, the protocol matching unit 220 converts the signals SigIn and SigOut based on the S2C protocol, which are input to and output from the NFC unit 210, into signals LA-LB based on the ISO protocol, which are input to and output from the security module 230, and converts the signals LA-LB based on the ISO protocol, which are input to and output from the security module 230, into the signals SigIn and SigOut based on the S2C protocol, which are input to and output from the NFC unit 210, between the NFC unit 210 and the security module 230. The generation of the chip identification signal CIS will be described in detail below.

Figure 3:
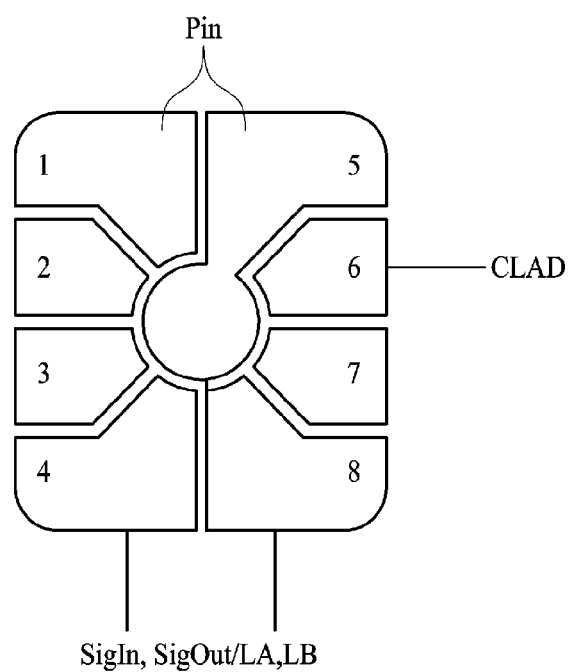
FIG. 3 is a view showing the appearance of the chip of a security module inserted into a plug-in socket.

The security module 230 is inserted into the socket 240 in a plug-in fashion, and may be a module having one of various authentication chips, such as a security authentication chip following the S2C protocol of NFC, the core chip of a contact smart card following the general ISO 7816 protocol or the core chip of a non-contact smart card following the ISO 14443 protocol. In particular, in the case where the security module 230 has the core chip of the non-contact smart card following the ISO 14443 protocol, the security module 230 operates in response to the signals LA-LB input to and output from the chip and can output authentication information stored therein to terminals LA-LB. The appearance of the chip in the security module 230 inserted into the plug-in socket 240 may follow that of a module having the core chip of a contact smart card following the ISO 7816 protocol, as shown in FIG. 3. In this case, the security module 230 may have eight external pins connected to the internal circuit of the chip. Accordingly, a plug-in socket corresponding to the chip specifications of the contact smart card based on the ISO 7816 protocol is used as the socket 240 into which the security module 230 is inserted.

In general, in the core chip of the contact smart card based on the ISO 7816 protocol, pins Nos. 1, 2, 3, 5, and 7 are used, while in the present disclosure, pins Nos. 4 and 8 may be used as the I/O signal (SigIn and SigOut) pins of the security authentication chip following the S2C protocol of NFC, which may be inserted as the security module 230, or the I/O signal (LA-LB) pins of the core chip of the non-contact smart card following the general ISO 14443 protocol. Furthermore, pin No. 6 may be used as a Contactless Appearance Detection (CLAD) signal pin that is used to detect whether a chip is a non-contact chip.

Figure 4:
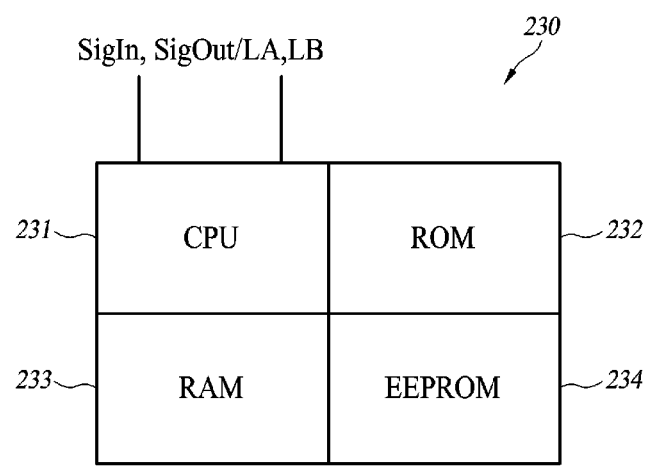
FIG. 4 is a diagram showing an example of the detailed construction of the security module of FIG. 2.

FIG. 4 is a diagram showing an example of the detailed construction of the security module 230 of FIG. 2. Referring to FIG. 4, the security module 230 may include a Central Processing Unit (CPU) 231, Read-Only Memory (ROM) 232, Random Access Memory (RAM) 233, and Electrically Erasable Programmable ROM (EEPROM 234). The CPU 231 is responsible for the overall control of the security module 230. The ROM 232 stores an overall system program for the operation of the security module 230. The RAM 233 stores temporary data necessary at the time of operation of internal data. The EEPROM 234 stores authentication information for transmission and reception in conjunction with an external card reader or other terminals.

In FIG. 2, the protocol matching unit 220 includes a selection unit 221, a chip identification unit 222, and a protocol conversion unit 223.

The chip identification unit 222 transmits a request signal to the security module 230, and generates a chip identification signal CIS in response to a signal received in response to the request signal. In the case where the security module 230 is identified as a module having a chip based on the S2C protocol according to the chip identification signal CIS, the selection unit 221 bypasses the signals SigIn and SigOut based on the S2C protocol, which are input to and output from the NFC unit 210, to the security module 230. In the case where the security module 230 is identified as a module having a chip based on the ISO protocol according to the chip identification signal CIS, the selection unit 221 outputs the signals SigIn and SigOut based on the S2C protocol, which are input to and output from the NFC unit 210, to the protocol conversion unit 223 as signals for protocol conversion. Accordingly, in the case where the security module 230 is identified as a module having a chip based on the ISO protocol according to the chip identification signal CIS, the protocol conversion unit 223 performs protocol conversion such that the signals SigIn and SigOut based on the S2C protocol for the protocol conversion, which are output from the selection unit 221, are compatible with the signals LA-LB input to and output from the security module 230.

Figure 5:
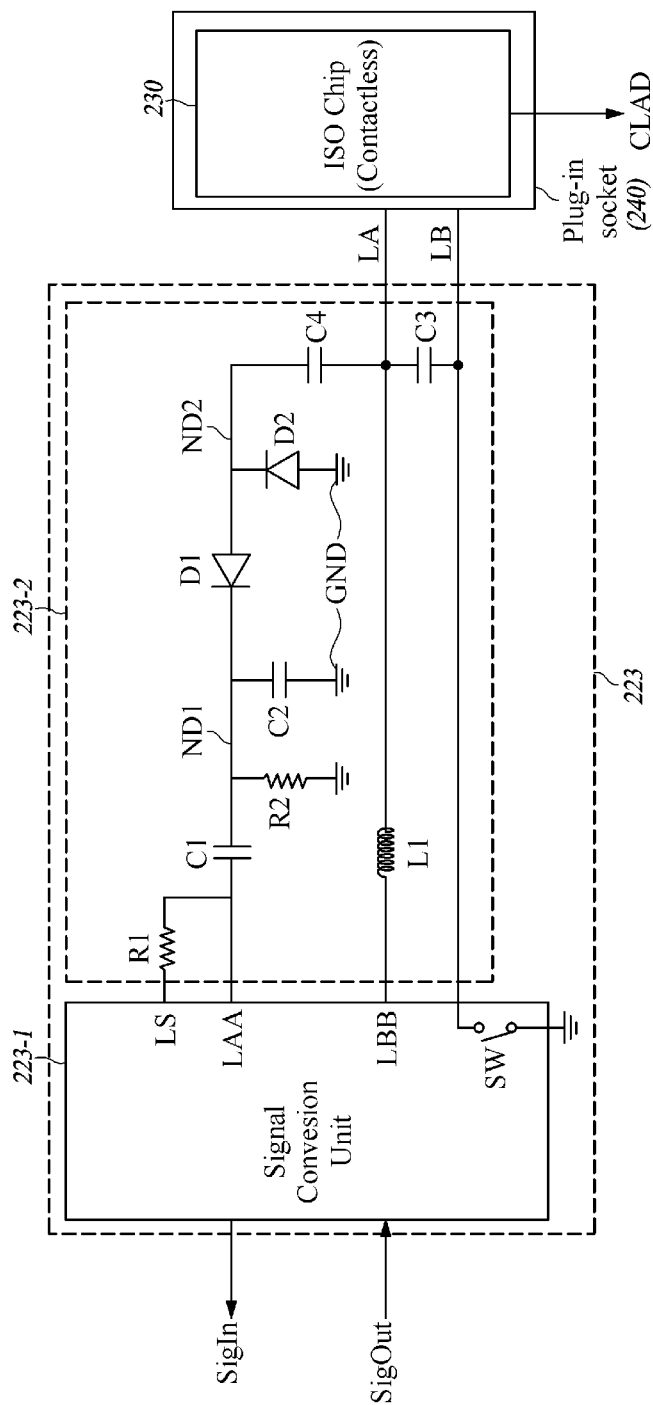
FIG. 5 is a detailed block diagram showing the relationship between the protocol conversion unit and ISO chip of FIG. 2.

A detailed block diagram showing the relationship between the protocol conversion unit 223 of FIG. 2 and a chip based on the ISO protocol, which is inserted into the security module 230, when the protocol conversion unit 223 performs the protocol conversion is shown in FIG. 5. Referring to FIG. 5, the protocol conversion unit 223 includes a signal conversion unit 223-1 and a waveform shaping unit 223-2.

The signal conversion unit 223-1 performs protocol conversion such that Miller coded signals based on the S2C protocol are compatible with Manchester coded signals based on the ISO protocol.

Figure 6:
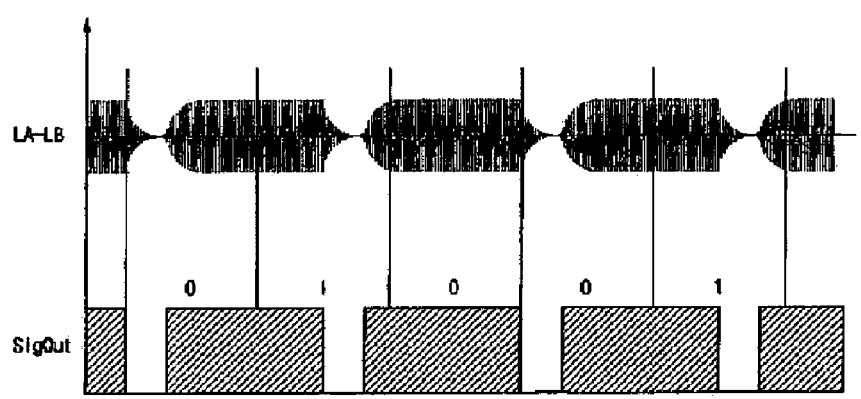
FIG. 6 is a waveform diagram of a process in which a signal based on the S2C protocol received from an NFC unit is converted into a signal based on the ISO protocol and is then output to the security module.

For example, the signal SigOut based on the S2C protocol, which is received from the NFC unit 210, is a digital signal coded using Miller coding, as shown in the lower view of FIG. 6. An analog signal LAA-LBB, which is generated by the signal conversion unit 223-1 and output to the waveform shaping unit 223-2, is a signal that is modulated and coded using Manchester coding, as shown in the upper view of FIG. 6. As shown in FIG. 6, the signal conversion unit 223-1 converts the signal SigOut coded using Miller coding into an analog signal having a constant frequency peak-to-peak level according to the logic states of the Miller coded signal SigOut. In other words, the signal conversion unit 223-1 converts a digital signal having a high logic state into an analog signal having a high peak-to-peak level, and converts a digital signal having a low logic state into an analog signal having a low peak-to-peak level. The digital code based on Miller coding is based on a coding scheme in which a signal having a low logic state at the initial part of a constant period is considered to be "0" and a signal having a low logic state at the intermediate part of a constant period is considered to be "1", as shown in FIG. 6. The signal based on Manchester coding is based on a coding scheme in which a digital value based on Miller coding is modulated to a subcarrier type, as shown in FIG. 6.

The waveform shaping unit 223-2 performs waveform shaping such that the analog signal LA-LB output to the security module 230 is greater than the analog signal LAA-LBB output to the signal conversion unit 223-1 between the signal conversion unit 223-1 and the security module 230.

Figure 7:
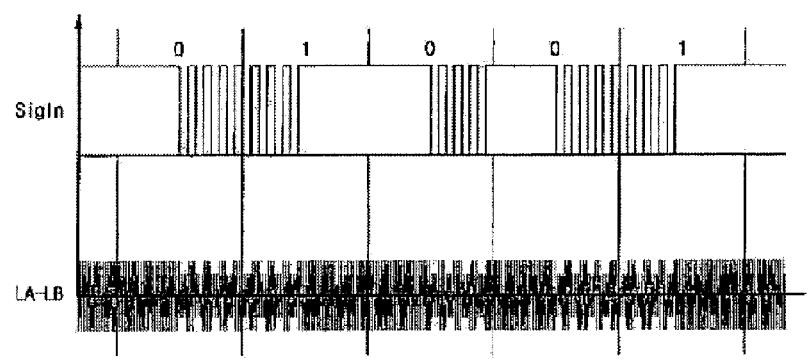
FIG. 7 is a waveform diagram of a process in which a signal based on the ISO protocol received from the security module is converted into a signal based on the S2C protocol and is then output to the NFC unit.

In a similar way, the analog signal LA-LB output from the security module 230 is a digital signal, which is modulated and coded using Manchester coding, as shown in the lower view of FIG. 7. The analog signal LA-LB is waveform-shaped into the signal LAA-LBB by the waveform shaping unit 223-2, and is then converted into the signal SigIn based on the S2C protocol by the signal conversion unit 223-1.

In FIG. 5, the waveform shaping unit 223-2 includes a first resistor R1, a second resistor R2, a first diode D1, a second diode D2, a first capacitor C1, a second capacitor C2, a third capacitor C3, a fourth capacitor C4, and an inductor L1. The circuit of FIG. 5 showing the waveform shaping unit 223-2 is only an example, therefore one of various circuits for waveform shaping may be used. The first resistor R1 is connected between a first terminal LS and a second terminal LAA, which are connected to the signal conversion unit 223-1. The first capacitor C1 is connected between the second terminal LAA, which is connected to the signal conversion unit 223-1, and a first node ND1. The second resistor R2 is connected between the first node ND1 and a ground GND. The second capacitor C2 is connected between the first node ND1 and the ground GND. The first diode D1 is connected between the first node ND1 and a second node ND2. The second diode D2 is connected between the second node ND2 and the ground GND. The third capacitor C3 is connected between a first terminal LA and a second terminal LB, which are connected to the security module 230. The fourth capacitor C4 is connected between the first terminal LA, which is connected to the security module 230, and the second node ND2. The inductor L1 is connected between a third terminal LBB, which is connected to the signal conversion unit 223-1, and the first terminal LA, which is connected to the security module 230.

In the case where the protocol converted signals are input to and output from the security module 230, the signal conversion unit 223-1 turns on a switch SW, so the ground GND is applied to the second terminal LB, which is connected to the security module 230, to operate the waveform shaping unit 223-2.

Accordingly, the signals LA-LB via the terminals connected to the security module 230 are decreased in size by the waveform shaping unit 223-2 and then output to the signal conversion unit 223-1, and the signals LAA-LBB from the signal conversion unit 223-1 are increased in size by the waveform shaping unit 223-2 and then output to the security module 230, through the general operation of the first diode D1 and second diode D2 of the waveform shaping unit 223-2 and the R-C filter (R2, C2) circuit operation of the waveform shaping unit 223-2. For example, the signals LAA-LBB output to the signal conversion unit 223-1 may have a peak-to-peak level of about 3 V and the signals LA-LB output to the security module 230 may have a peak-to-peak level of about 12 to 13 V.

The operation of the protocol matching unit 220 is described in more detail below with reference to the flowchart of FIG. 8.

Figure 8:
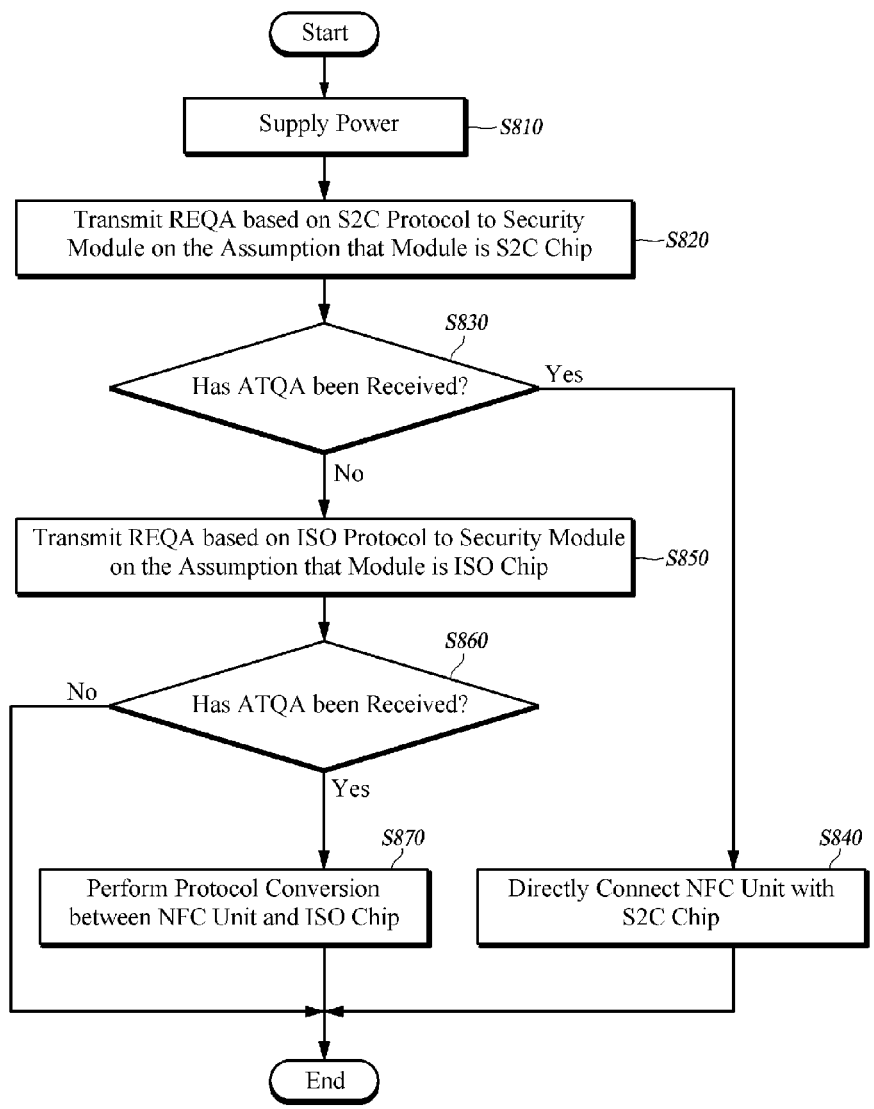
FIG. 8 is a flowchart showing the operation of the protocol matching unit of FIG. 2.

When power is supplied to the protocol matching unit 220, a voltage is transferred to the security module 230 and the security module 230 enters an operating state at step S810 of FIG. 8. In this initial state, the chip identification unit 222 first assumes that the security module 230 has a chip based on the S2C protocol and then transmits a request signal (REQA: Request A) (for example, 0x26 in the hexadecimal system) based on the S2C protocol to the SigOut (or the terminal LA) terminal of the security module 230 at step S820 of FIG. 8. The chip identification unit 222 then determines whether a response signal (ATQA: Answer to Request A) (for example, 0403 in the hexadecimal system) based on the S2C protocol has been received from the SigIn terminal (or the terminal LB) of the security module 230 within a predetermined time (for example, 5 msec) at step S830 of FIG. 8. If the response signal ATQA has been received, the chip identification unit 222 generates a chip identification signal CIS indicating that the security module 230 is a module having a chip based on the S2C protocol. The chip identification signal CIS may be output in a low logic state. If the chip identification signal CIS is output in a low logic state, the selection unit 221 directly connects the NFC unit 210 with the chip based on the S2C protocol, which is inserted as the security module 230, and bypasses the signals SigIn and SigOut based on the S2C protocol, which are input to and output from the NFC unit 210, to the security module 230 at step S840 of FIG. 8.

In contrast, if the response signal ATQA based on the S2C protocol has not been received at step S830, the chip identification unit 222 assumes that the security module 230 has a chip based on the ISO protocol and transmits a request signal REQA (for example, 0x26 in a hexadecimal system) based on the ISO protocol to the LA-LB terminals (or the SigIn and SigOut terminals) of the security module 230 at step S850 of FIG. 8. The chip identification unit 222 then determines whether the response signal ATQA (for example, 0403 in a hexadecimal system) based on the ISO protocol has been received from the LA-LB terminals (or the SigIn and SigOut terminals) of the security module 230 within a predetermined time (for example, 5 msec) after the request signal REQA has been transmitted at step S860 of FIG. 8. If the response signal ATQA has been received, the chip identification unit 222 generates a chip identification signal CIS indicating that the security module 230 is a module having a chip based on the ISO protocol. The chip identification signal CIS may be output in a high logic state. In the case where the chip identification signal CIS is output in a high logic state, the selection unit 221 outputs the signals SigIn and SigOut based on the S2C protocol to the protocol conversion unit 223 to perform protocol conversion that allows the signals SigIn and SigOut based on the S2C protocol, which are input to and output from the NFC unit 210, to be compatible with the signal LA-LB based on the ISO protocol, which is input to and output from the security module 230, thereby allowing communication between the NFC unit 210 and the chip based on the ISO protocol, which is inserted as the security module 230. Accordingly, the protocol conversion unit 223 performs protocol conversion so that the signals SigIn and SigOut based on the S2C protocol for the protocol conversion are compatible with the signal LA-LB input to and output from the security module 230 at step S870 of FIG. 8.

As described above, the chip identification unit 222 first determines whether the security module 230 is a module having a chip based on the S2C protocol. The reason for this is that the chip identification unit 222 has a digital peak-to-peak level of 3 to 5 V based on the Miller coding when it transmits the request signal REQA based on the S2C protocol and receives the response signal ATQA through the terminals SigIn and SigOut (or the terminals LA and LB) of the security module 230, but has an analog peak-to-peak level of 12 to 13 V based on the Manchester coding when it transmits the request signal REQA based on the ISO protocol to the security module 230 and receives the response signal ATQA. As described above, damage to circuits due to the application of a high voltage to the security module 230 can be prevented in such a way as to determine whether the security module 230 operates at a low voltage (that is, it operates in accordance with the S2C protocol).

Meanwhile, the secure NFC apparatus 200 according to an embodiment of the present disclosure, which is shown in FIG. 2, may be mounted in a mobile communication terminal and communicate with a reader, as shown in FIG. 9.

For example, a user who desires to pass through a security gate can transmit authentication information to a reader for entry authentication through the antenna 211 of the secure NFC apparatus 200 by bringing the mobile communication terminal equipped with the secure NFC apparatus 200 close to a main body (that is, the reader) mounted in the security gate for entry authentication.

That is, when information requesting authentication is received from the reader through the antenna 211 of the secure NFC apparatus 200, information based on a received signal can be transmitted to the security module 230 through the NFC unit 210 and the protocol matching unit 220. In this case, the security module 230 extracts authentication information, such as a user Identification (ID) for user identification, stored in the EEPROM 234 under the control of the CPU 231. The extracted authentication information can be transmitted to the reader through the protocol matching unit 220 and the NFC unit 210. If corresponding authentication is successful in the reader, the user can pass through the security gate.

Furthermore, in the case where a reader for transportation or payment is used, a user brings a mobile communication terminal equipped with the secure NFC apparatus 200 close to the reader, and can use transportation or pay the cost if the authentication of the amount of charged money is successful in the reader.

Furthermore, the secure NFC apparatus 200 according to an embodiment of the present disclosure, which is shown in FIG. 2, can be mounted in different mobile communication terminals and enable peer-to-peer communication, as shown in FIG. 10.

For example, currently many users store electronic name cards, photos, motion images, and/or telephone directories in their mobile communication terminals, and then use them. However, only when such personal information is input again or downloaded when terminals are changed can users use personal information, which was stored in previous terminals, in current terminals.

However, in the present embodiment, such personal information can be managed in the security module 230 of the secure NFC apparatus 200 mounted in the mobile communication terminal. When personal information is managed in the security module 230, it is possible to move the personal information to a peer terminal through communication between mobile communication terminals.

For example, mobile communication terminals equipped with the secure NFC apparatus 200 are brought close to each other, and one of the mobile communication terminals attempting to transmit personal information can send the personal information, along with authentication information, to the other mobile communication terminal through the antenna 211 of the secure NFC apparatus 200. When the other mobile communication terminal receives the authentication information and the personal information through the antenna 211 of the secure NFC apparatus 200, the other mobile communication terminal can transmit information based on received signals to the security module 230 through the NFC unit 210 and the protocol matching unit 220. In this case, the security module 230 can perform authentication under the control of the CPU 231, store the personal information included in the received signals in the EEPROM 234 if the authentication is successful, and manage the stored personal information.

As described above, in the secure NFC apparatus 200 according to the present disclosure, the protocol matching unit 220 identifies the type of the chip in the security module 230, which is inserted in a plug-in fashion, generates a chip identification signal CIS according to the results of the identification, and matches the protocol of the signals SigIn and SigOut based on the S2C protocol, which are input to and output from the NFC unit 210, with the protocol of the signals LA-LB, which are input to and output from the security module 230, according to the chip identification signal CIS.

The secure NFC method according to an embodiment of the present disclosure may be implemented in program instruction form that can be executed through a variety of computer means, and recorded in a computer-readable medium. The computer-readable medium may include program instructions, data files, a data structure or a combination thereof. The program instructions recorded in the computer-readable medium may be specially designed and constructed for the present disclosure, or be well known to those skilled in the field of computer software. Examples of the computer-readable recording medium include magnetic media such as a hard disk, a floppy disk and a magnetic tape, optical media such as Compact Disk (CD)-ROM and a Digital Versatile Disk (DVD), magneto-optical media such as a floptical disk, and hardware devices such as ROM, RAM and flash memory, that are specially designed to store and execute program instructions. The computer-readable medium may be a transmission medium, such as light including a carrier that transmits signals designating program instructions or data structures, a metallic line, or a waveguide. Examples of the program instructions include not only machine language code constructed by a compiler but also high level language code executable by a computer via an interpreter. The hardware devices may be constructed to act as one or more software modules for performing the operation of the present disclosure, and vice versa.

As described above, in the secure NFC apparatus according to the present disclosure, signals based on the S2C protocol of NFC are selectively converted into signals suitable for the protocol of another a security authentication module. Therefore, the secure NFC apparatus of the present disclosure can support not only a security authentication module based on the S2C protocol but also a variety of security authentication modules, such as general contact/non-contact smart cards, which are inserted into the socket in a plug-in fashion. Accordingly, the present disclosure is advantageous in that user authentication information managed in various security authentication modules can be used in an easily compatible fashion.

Furthermore, the present disclosure is advantageous in that data communication between portable terminals (that is, peers), such as mobile communication terminals, is freely performed, therefore personal information, such as electronic name cards, photos, moving images, and telephone directories, can be easily managed.

Although the specific embodiments of the present disclosure have been disclosed for illustrative purposes, those skilled in the art will appreciate that various modifications, additions and substitutions are possible, without departing from the scope of the disclosure as disclosed in the accompanying claims.

The invention claimed is:

1. A terminal, comprising:
a socket configured to receive a security module;
an NFC (Near Field Communication) unit configured to communicate with an external reader or another terminal; and
a protocol identifying unit configured to
supply a voltage to the security module, and
identify whether the security module supports a first protocol by transmitting a signal for using the first protocol through a first contact of the security module and receiving from the security module a first information associated with a protocol supported by the security module, the first protocol being a signal processing scheme for exchanging data between the NFC unit and the security module,
wherein the terminal is additionally configured to receive a second information associated with the protocol supported by the security module through a second contact of the security module, the second contact being different from the first contact, and
wherein the NFC unit is configured to
receive an information from the security module through the first contact based on the first protocol when the protocol identifying unit determines that the security module supports the first protocol, and
transmit the received information to the external reader or another terminal.

2. The terminal of claim 1, wherein the protocol identifying unit is configured to determine that the security module supports the first protocol upon receiving the first information within a time period after transmitting the signal.

3. The terminal of claim 1, wherein the first contact is configured to support a second protocol which is different from the first protocol.

4. The terminal of claim 1, wherein the signal is encoded by a Miller code.

5. The terminal of claim 1, wherein the NFC unit, upon receiving an authentication information request from the external reader, is configured to transmit the authentication information request to the security module through the first contact and receive an authentication information from the security module, based on the first protocol.

6. The terminal of claim 3, wherein the protocol identifying unit is configured to identify whether the security module supports the second protocol by transmitting a signal for using the second protocol through the first contact and receiving from the security module an information associated with the protocol supported by the security module.

7. A communication method, comprising:
supplying a prescribed voltage to a security module;
identifying whether the security module supports a first protocol by transmitting a signal for using the first protocol through a first contact of the security module and receiving from the security module a first information associated with a protocol supported by the security module, the first protocol being a signal processing scheme for exchanging data between an NFC (Near Field Communication) unit and the security module;
receiving a second information associated with the protocol supported by the security module through a second contact of the security module, the second contact being different from the first contact;
receiving an information from the security module through the first contact based on the first protocol when the security module supports the first protocol; and
transmitting the received information through the NFC unit to an external reader or another terminal.

8. The method of claim 7, wherein the security module is determined to support the first protocol upon receiving the first information within a time period after transmitting the signal for using the first protocol.

9. The method of claim 7, wherein the first contact is configured to support a second protocol which is different from the first protocol.

10. The method of claim 7, wherein the signal is encoded by a Miller code.

11. The method of claim 7, further comprising:
receiving an authentication information request from the external reader; and
transmitting the authentication information request to the security module through the first contact and receiving an authentication information stored in the security module, based on the first protocol.

12. The method of claim 9, further comprising;
checking whether the security module supports the second protocol by transmitting a signal for use of the second protocol through the first contact and receiving from the security module an information associated with the protocol supported by the security module.

* * * * *